US007237019B2

(12) United States Patent
Sogabe et al.

(10) Patent No.: US 7,237,019 B2

(45) Date of Patent: Jun. 26, 2007

(54) APPARATUS FOR NOTIFYING A SYSTEM ADMINISTRATOR OR AN OPERATOR OF RECEPTION OF A MESSAGE CONTAINING MONITORED INFORMATION IN A MANNER SELECTED ACCORDING TO USER SITUATION

(75) Inventors: Katsumi Sogabe, Kawasaki (JP); Yuji Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 10/137,697

(22) Filed: May 3, 2002

(65) Prior Publication Data

US 2002/0129141 A1 Sep. 12, 2002

Related U.S. Application Data

(63) Continuation of application No. PCT/JP00/00207, filed on Jan. 18, 2000.

(51) Int. Cl.

*G06F 15/173* (2006.01)
*H04M 3/08* (2006.01)
*H04M 3/22* (2006.01)
*G06F 11/00* (2006.01)

(52) U.S. Cl. .............. 709/223; 379/32.01; 379/100.05; 714/39; 714/47

(58) Field of Classification Search ........ 709/223–225, 709/207, 240, 245; 379/32.01, 100.05; 714/39, 714/47, 51

See application file for complete search history.

(56) References Cited

U.S. PATENT DOCUMENTS 5,621,892 A * 4/1997 Cook .......................... 709/224
5,631,847 A * 5/1997 Kikinis ........................ 709/207

(Continued)

FOREIGN PATENT DOCUMENTS

JP 03194696 8/1991

(Continued)

OTHER PUBLICATIONS

Transcend Network Management for Windows article from 3Com published Apr. 17, 1997.*

(Continued)

*Primary Examiner*—Saleh Najjar
*Assistant Examiner*—V. Korobov
(74) *Attorney, Agent, or Firm*—Greer, Burns & Crain, Ltd

(57) ABSTRACT

In a message notification apparatus, message-type information defining one or more types of messages of which an operator is to be notified, and notification-manner information defining at least one manner in which the operator is to be notified of reception of each of the one or more types of messages are defined and stored. The message notification apparatus receives user-situation information indicating a situation of the operator. When the message notification apparatus receives a message, the message is compared with the one or more types of messages, and at least one notification manner is determined based on the notification-manner information and the user-situation information when the message is one of the one or more types of messages. Then, the message notification apparatus notifies the operator of reception of the message in the at least one notification manner.

7 Claims, 15 Drawing Sheets

U.S. PATENT DOCUMENTS

| | | | | |
|---|---|---|---|---|
| 5,832,066 | A * | 11/1998 | Sakaguchi et al. | 379/106.01 |
| 5,875,302 | A * | 2/1999 | Obhan | 709/225 |
| 5,991,806 | A * | 11/1999 | McHann, Jr. | 709/224 |
| 6,359,557 | B2 * | 3/2002 | Bilder | 340/531 |
| 2001/0052006 | A1 * | 12/2001 | Barker et al. | 709/223 |

FOREIGN PATENT DOCUMENTS

| | | |
|---|---|---|
| JP | 4-332227 | 11/1992 |
| JP | 07302214 | 11/1995 |
| JP | 07319539 | 12/1995 |
| JP | 10097444 | 4/1998 |
| JP | 11-008710 | 1/1999 |
| JP | 11-203006 | 7/1999 |
| JP | 11-296478 | 10/1999 |

OTHER PUBLICATIONS

Transcend LANsentry Manager article from 3Com published Apr. 24, 1997.*

Fujitsu System Walker/Centric MGR; pp. 481-528. Date: Oct. 1999.

* cited by examiner

100

110 MESSAGE DEFINITION FILE

111

```
[Index Section Start]
*¥t*¥t*¥t*¥t*PRINTER JAM*
MSP¥tGSCLOSE1¥t*¥t*¥t*Operations are closed today.*
XSP¥tXSPEX¥tXDM1010E¥t#SYSTEM¥t*SYSTEM SUBSYSTEM ERROR*
[Index Section End]
```

112

```
[Data Section Start]
PAPER JAM
VOICE¥t0¥tThere is a jam in a printer. Please remove the jam.¥t0
POPUP¥tThere is a jam in a printer. Please remove the jam.¥t0
[Data Section End]
[Data Section Start]
OPERATION CLOSED
VOICE¥t0¥tOperations are closed today. Night batch processing is started.¥t0
POPUP¥tOperations are closed today. Night batch processing is started.¥t2
EMAIL¥tSYSTEM ADMINISTRATOR¥tkanri@abc.co.jp¥tOperations are closed today.
Night batch processing is started.¥t1
EMAIL¥tOPERATOR¥top@abc.co.jp¥tOperations are closed today. Night batch
processing is started.¥t2
[Data Section End]
[Data Section Start]
SUBSYSTEM ABNORMALITY
TEL¥tSYSTEM ADMINISTRATOR¥t010-911-9999¥t1¥tA subsystem error has
occurred. Please restart the subsystem after you obtain a dump.¥t1
[Data Section End]
```

FIG. 12

APPARATUS FOR NOTIFYING A SYSTEM ADMINISTRATOR OR AN OPERATOR OF RECEPTION OF A MESSAGE CONTAINING MONITORED INFORMATION IN A MANNER SELECTED ACCORDING TO USER SITUATION

This application is a continuing application, filed under 35 U.S.C. §111(a), of International Application PCT/JP00/00207, filed Jan. 18, 2000.

BACKGROUND OF THE INVENTION

1) Field of the Invention

The present invention relates to a message notification apparatus for notifying an operator of reception of a message which contains information obtained by monitoring a system. For example, the monitored system is a multiserver system in which a plurality of computers operate.

2) Description of the Related Art

In the conventional multiserver systems in which a plurality of servers are used for a business, a management server which manages the plurality of servers are provided for managing messages indicating status of usage, operating status, work load, intervention events, and the like in a centralized manner. The messages are collected by the management server and displayed on a screen of a client (computer) in chronological order, where the client is connected to the management server. The client user of the above client is an operator or a system administrator of the multiserver system.

Conventionally, the client user is required to continuously monitor the screen of the client so that the client user can immediately address a problem when the problem is indicated on the screen. Therefore, the client user cannot leave the seat and do jobs other than the monitoring of the screen of the client. Even when the client user is present at the client, the client user may not notice or may overlook the messages displayed on the screen of the client. Thus, the system monitoring work imposes heavy load on the operator or system administrator.

SUMMARY OF THE INVENTION

An object of the present invention is to provide a message notification apparatus which can surely notify an operator or system administrator of reception of a message containing monitored information in a manner appropriate for the type of the message and the situation of the operator or system administrator so that the operator or system administrator is not required to continuously monitor a screen of a console client or the like on which the reception of the message is displayed.

(I) According to the first aspect of the present invention, there is provided a message notification apparatus comprising: a condition setting unit which receives message-type information defining one or more types of messages of which an operator is to be notified of reception, and notification-manner information defining at least one manner in which the operator is to be notified of reception of each of the one or more types of messages; a condition storing unit which stores the message-type information and the notification-manner information; a message comparing unit which receives user-situation information indicating a situation of the operator and a message output from a monitored system, and compares the message with the one or more types of messages based on the message-type information; a notification-manner determining unit which determines at least one manner in which the operator is to be notified of reception of the message, based on the notification-manner information and the user-situation information when the message is one of the one or more types of messages; and a notification unit which notifies the operator of reception of the message in the at least one manner determined by the notification-manner determining unit.

The message notification apparatus according to the first aspect of the present invention may also have one or a combination of the following additional features (i) to (v).

(i) The user-situation information may indicate whether or not the operator is present at the message notification apparatus.

(ii) The user-situation information may be input into the message notification apparatus by the operator.

(iii) The message notification apparatus according to the first aspect of the present invention may further comprise a user-location detection unit which detects information indicating whether or not the operator is present at the message notification apparatus, and generates the user-situation information.

(iv) The message-type information may indicate at least one of a system type, a system name, a message identifier, a job name, and a message text.

(v) The at least one manner defined by the notification-manner information may include at least one of telephone notification, voice notification, pop-up display notification, e-mail notification, and user-defined notification.

(II) According to the second aspect of the present invention, there is provided a message notification method comprising the steps of: (a) receiving user-situation information indicating a situation of an operator; (b) receiving a message from a monitored system; (c) acquiring message-type information and notification-manner information from a storage unit, where the message-type information defines one or more types of messages of which the operator is to be notified of reception, and the notification-manner information defines at least one manner in which the operator is to be notified of reception of each of the one or more types of messages; (d) comparing the message received in step (b) with the one or more types of messages defined by the message-type information; (e) determining at least one manner in which the operator is to be notified of reception of the message, based on the notification-manner information and the user-situation information when the message is one of the one or more types of messages; and (f) notifying the operator of reception of the message in the at least one manner determined in step (e).

(III) According to the third aspect of the present invention, there is provided a computer-readable storage medium storing a program which makes a computer behave as the message notification apparatus according to the first aspect of the present invention.

(IV) As explained above, according to the present invention, when the monitored system outputs a message, the message notification apparatus determines at least one notification manner which is appropriate for the type of the message and an operator or system administrator, and notifies the operator or system administrator of the output of the message in the at least one notification manner.

Therefore, the operator or system administrator is not required to constantly monitor a console client or the like, and the work load imposed on the operator or system administrator can be reduced.

In addition, since the operator or system administrator can be surely notified of the output of the message, the operator or system administrator can quickly address a problem informed by the message, and efficiently manage the monitored system.

Further, it is possible to reduce the total cost for introduction, operations, and management of equipment, machines, and the like in a construction stage of a new operation management system.

(V) The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 12 is a diagram illustrating examples of contents of the message definition file in FIG. 2;

DESCRIPTION OF THE PREFERRED EMBODIMENTS

Embodiments of the present invention are explained below with reference to drawings.

(I) Basic Construction

Figure 1:
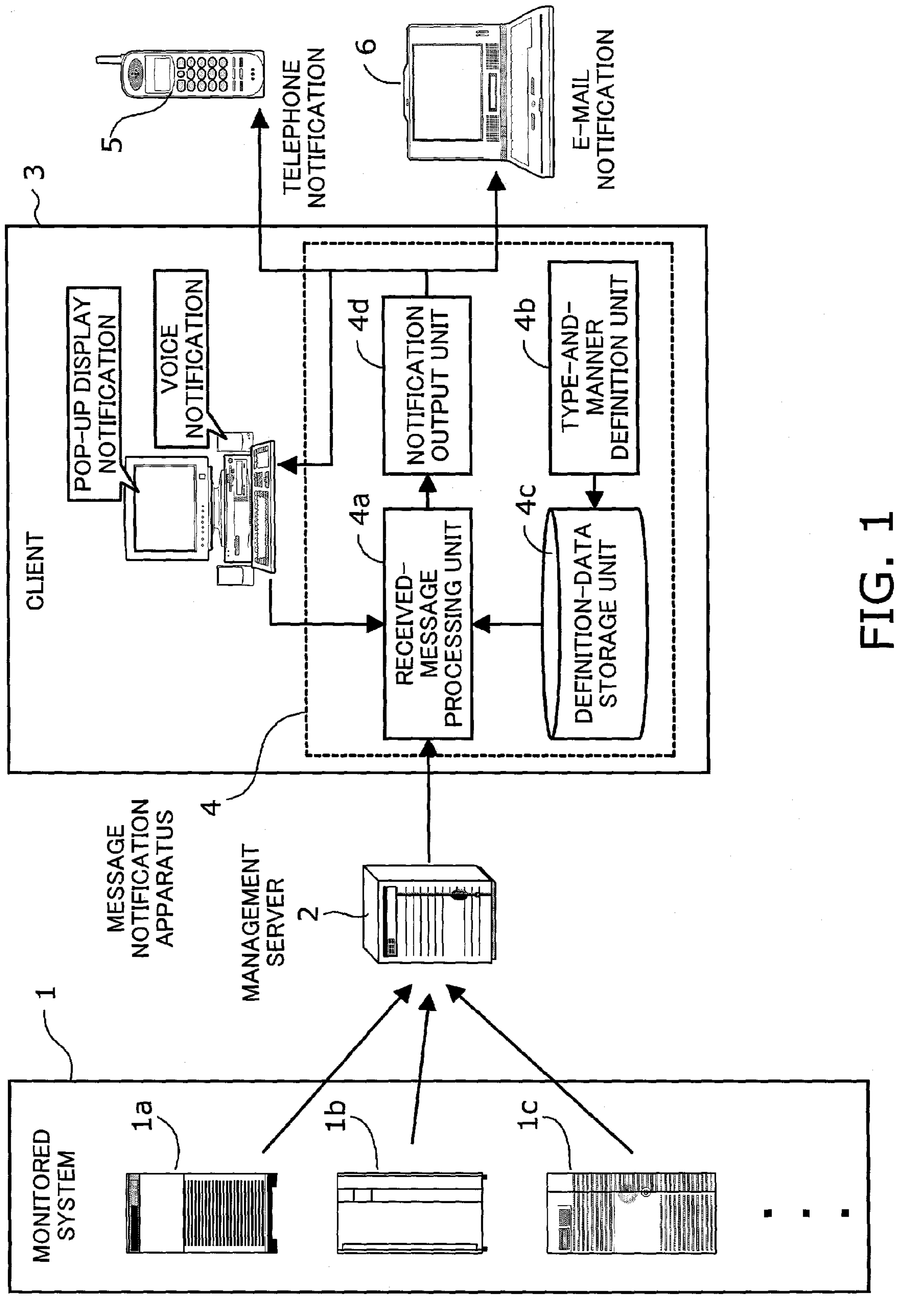
FIG. 1 is a diagram illustrating a basic construction of a message notification apparatus according to the present invention and an example of a construction for monitoring a multiserver system, in which the message notification apparatus is used.

FIG. 1 is a diagram illustrating a basic construction of the message notification apparatus according to the present invention and an example of a construction for monitoring a multiserver system, in which the message notification apparatus is used.

The multiserver system 1 includes a plurality of servers 1*a*, 1*b*, 1*c*, . . . , which output messages respectively containing pieces of monitored information generated by the servers 1*a*, 1*b*, 1*c*, . . . The management server 2 receives the messages from the servers 1*a*, 1*b*, 1*c*, . . . , and sends the messages to the client 3, which receives the messages and displays the messages on a screen.

The message notification apparatus 4 is arranged in the client 3, and comprises a received-message processing unit 4*a*, a type-and-manner definition unit 4*b*, a definition-data storage unit 4*c*, and a notification output unit 4*d*.

The type-and-manner definition unit 4*b* is provided for defining one or more types of messages of which the message notification apparatus 4 should notify an operator or system administrator when the client 3 receives the one or more types of messages, and at least one manner in which the message notification apparatus 4 should notify the operator or system administrator of reception of each of the one or more types of messages.

The received-message processing unit 4*a* receives information on a situation of the operator or system administrator, which is input through an input device of the client 3 and indicates, for example, whether or not the operator or system administrator is present at the client 3. In addition, when the client 3 receives a message sent from the management server 2, the received-message processing unit 4*a* determines whether or not the received message is one of the one or more types of messages defined by the type-and-manner definition unit 4*b*. When yes is determined, the received-message processing unit 4*a* determines at least one manner, corresponding to the one of the one or more types of messages, in which the message notification apparatus 4 should notify the operator or system administrator of the reception of the message, and requests the notification output unit 4*d* to notify the operator or system administrator of the reception of the message in the at least one manner. The at least one manner is determined based on the information on the situation of the operator or system administrator. For example, the at least one manner is determined to be voice notification or pop-up display notification when the operator or system administrator is present at the client 3, or telephone notification or e-mail notification when the operator or system administrator is not present at the client 3. Alternatively, in either case, the message notification apparatus 4 may notify the operator or system administrator of the reception of the message in more than one manner.

The notification output unit 4*d* notifies the operator or system administrator of the reception of the message in the at least one manner. In the case of the telephone notification, the notification output unit 4*d* calls the operator or system administrator to a telephone 5, and notifies the operator or system administrator of the reception of the message with synthesized voice when the operator or system administrator takes the call. In the case of the e-mail notification, the notification output unit 4*d* sends a predefined character string corresponding to the message to an e-mail address of the operator or system administrator designated by the operator or system administrator. When the operator or system administrator reads the character string by using a terminal 6, the operator or system administrator is notified of the reception of the message.

In the case of the voice notification, the notification output unit 4*d* notifies the reception of the message with synthesized voice by using a sound production device. In the case of the pop-up display notification, the notification output unit 4*d* controls the client 3 so as to display on the screen of the client 3 a pop-up notification window in which a predefined character string corresponding to the message is indicated. Thus, the operator or system administrator is notified of the reception of the message.

As described above, according to the present invention, the operator or system administrator can be notified of reception of a message in an appropriate manner determined according to the situation of the operator or system administrator. That is, the notification can be appropriately performed, and the operator or system administrator can recognize the reception of the message.

(II) First Embodiment

The first embodiment of the present invention is explained below.

Figure 2:
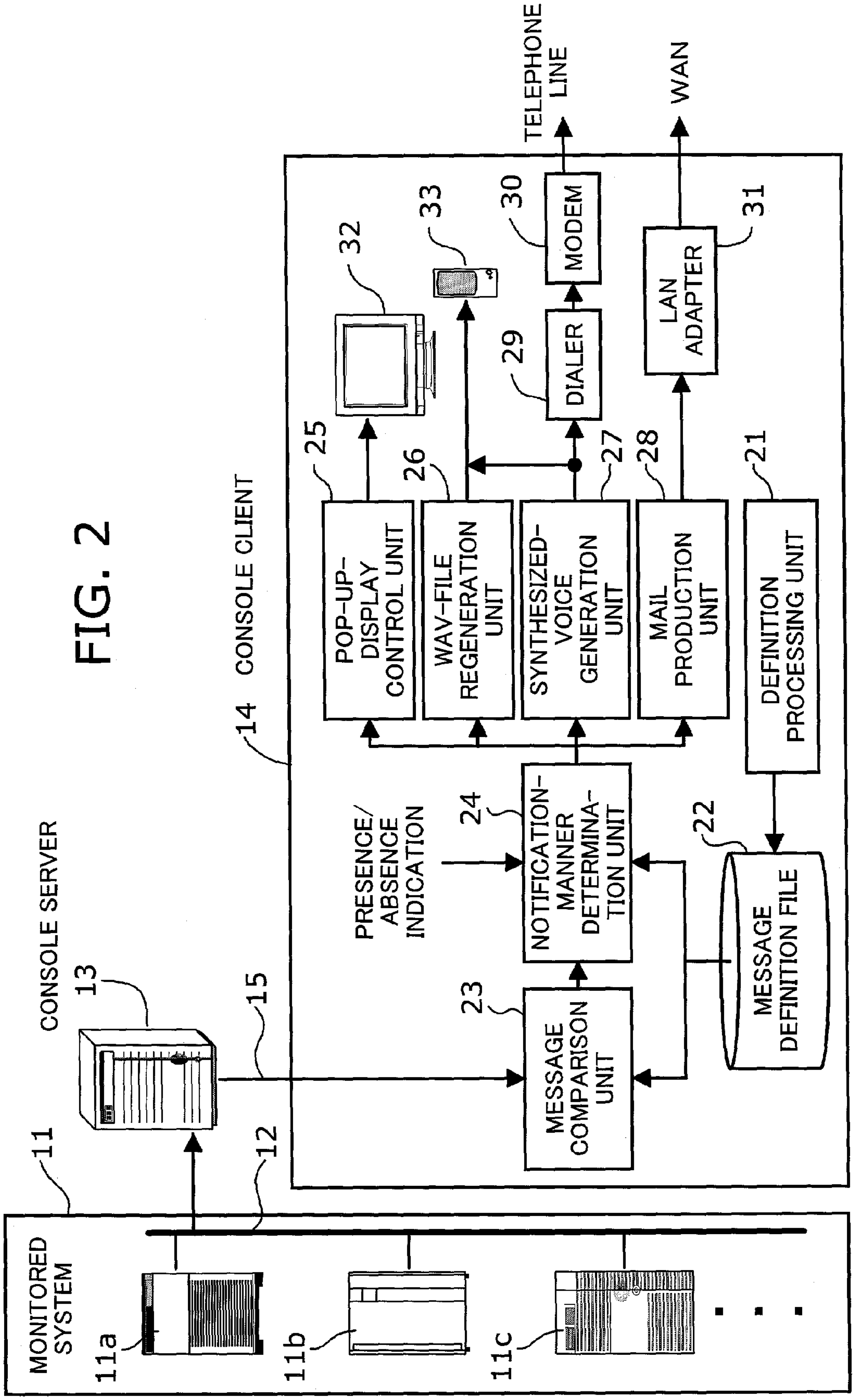
FIG. 2 is a diagram illustrating a construction of a message notification apparatus as a first embodiment of the present invention and an outline of a system for monitoring a multiserver system.

FIG. 2 is a diagram illustrating a construction of the message notification apparatus as the first embodiment of the present invention together with an outline of a system for monitoring a multiserver system.

The multiserver system 11 includes a plurality of servers 11*a*, 11*b*, 11*c*, . . . , which can operate based on identical or different operating systems such as Solaris (a product of Sun Microsystems, Inc.), Windows NT (a registered trademark of Microsoft Corporation in the United States and other countries), SXO (a registered trademark of Fujitsu Limited in Japan and other countries), respectively.

The plurality of servers 11*a*, 11*b*, 11*c*, . . . are interconnected through a LAN (local area network) 12. A console server 13 is connected to the LAN 12, and collects messages from the plurality of servers 11*a*, 11*b*, 11*c*, . . . The console server 13 is also connected to a console client 14 through another LAN 15. The console client 14 displays the messages collected by the console server 13. When the console client 14 is far away from the console server 13, the console client 14 and the console server 13 may be connected through a communication line.

The console client 14 comprises a definition processing unit 21, a message definition file 22, a message comparison unit 23, a notification-manner determination unit 24, a pop-up-display control unit 25, a WAV-file regeneration unit 26, a synthesized-voice generation unit 27, a mail production unit 28, a dialer 29, a modem 30, a LAN adapter 31, a monitor 32, and a speaker 33.

One or more types of messages of which a client user (operator or second-type administrator) wishes to be notified of reception are set as a notification condition by the definition processing unit 21. In addition, at least one manner (notification manner) in which the client user wishes to be notified of the reception of each of the one or more types of messages is set by the definition processing unit 21. The one or more types of messages (notification condition) and the at least one manner are stored in the message definition file 22.

The message comparison unit 23 compares a message which is received from the multiserver system 11 and displayed by the monitor 32, with the one or more types of messages stored in the message definition file 22, in order to determine whether or not the message received from the multiserver system 11 is one of the one or more types of messages stored in the message definition file 22. When yes is determined, the notification-manner determination unit 24 determines the at least one manner defined for the type of the received message to be at least one manner in which the client user is to be notified of the reception of the message, based on information indicating whether or not the client user is present at the console client 14, which is input into the notification-manner determination unit 24 by the client user before the determination of the manner.

When the notification-manner determination unit 24 determines that the client user is to be notified of the reception of the message by the pop-up display notification, the notification-manner determination unit 24 sends to the pop-up-display control unit 25 a notification text which is predefined corresponding to the received message, and the pop-up-display control unit 25 controls the monitor 32 so as to display a pop-up notification window including the notification text corresponding to the received message.

When the notification-manner determination unit 24 determines that the client user is to be notified of the reception of the message by the voice notification, the voice notification can be realized in two ways. The first way is to regenerate a voice message signal from a WAV file corresponding to the received message. That is, the WAV-file regeneration unit 26 reads a WAV file (not shown) in which a voice message signal is recorded, regenerates the voice message signal from the WAV file, and supplies the voice message signal to the speaker 33, where the voice message signal represents a notification text which is predefined corresponding to the received message. Thus, the speaker 33 outputs the voice message, i.e., reads out the notification text. The second way is to generate synthesized voice based on character-string information corresponding to the received message. In this case, character-string information corresponding to the received message is input into the synthesized-voice generation unit 27, which converts the character-string information into a voice message signal and supplies the voice message signal to the speaker 33, where the character-string information represents a notification text which is predefined corresponding to the received message. Thus, the speaker 33 outputs a voice message corresponding to the received message, i.e., reads out the notification text. One of the above two ways of voice notification is defined by the definition processing unit 21 and stored in the message definition file 22.

When the notification-manner determination unit 24 determines that the client user is to be notified of the reception of the message by the telephone notification, character-string information corresponding to the received message is input into the synthesized-voice generation unit 27, and the synthesized-voice generation unit 27 converts the character-string information into a voice message signal, where the character-string information represents a notification text which is predefined corresponding to the received message. Then, the dialer 29 makes a phone call through the modem 30 by dialing a telephone number designated by the operator or system administrator, so that the voice message signal is transmitted to the client user through the telephone line.

When the notification-manner determination unit 24 determines that the client user is to be notified of the reception of the message by the e-mail notification, character-string information corresponding to the received message, as well as an e-mail address designated by the operator or system administrator, is input into the mail production unit 28, and the mail production unit 28 produces an e-mail including the character-string information, and transmits the e-mail to a mail server, which is located on a WAN (Wide Area Network) and not shown. The character-string information represents a notification text which is predefined corresponding to the received message. When the client user reads the character string by using an appropriate terminal, the client user is notified of the reception of the message.

(III) First Example of Definition of Notification Condition

Examples of operations for defining a notification condition (i.e., a type of message of which the client user is to be notified) and at least one manner in which the client user is to be notified of reception of the type of message are explained below with reference to FIGS. 3 to 10. In the following examples, the definition processing unit 21 makes the monitor 32 display a Notification Setting dialog box which prompts the client user to input information for defining a type of message of which the client user is to be notified or a manner in which the client user is to be notified of reception of a type of message.

Figure 3:
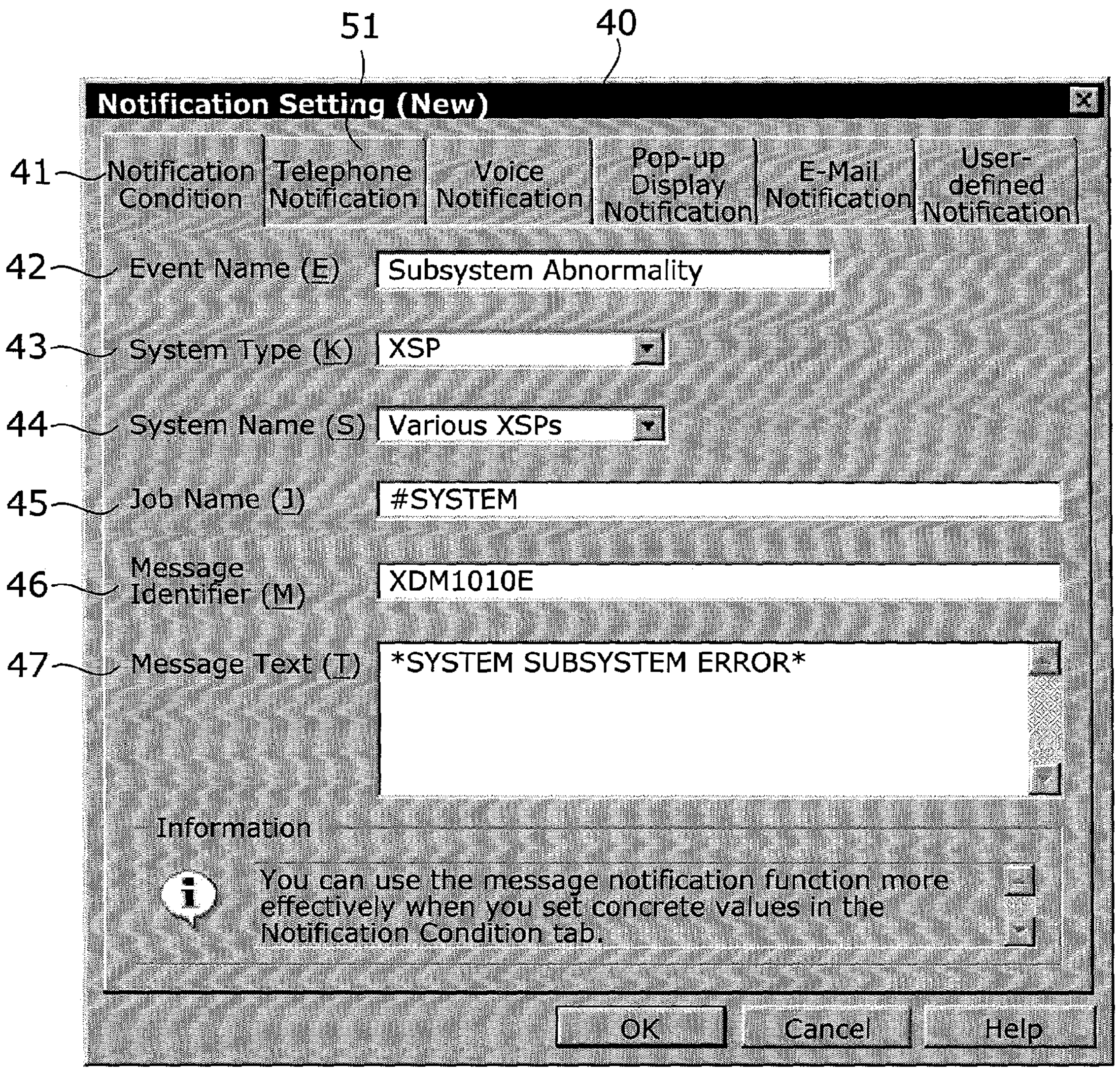
FIG. 3 is a diagram illustrating an example of a Notification Condition tab of a Notification Setting dialog box.

FIG. 3 is a diagram illustrating an example of a Notification Condition tab 41 of a Notification Setting dialog box which is first displayed by the definition processing unit 21 in order to prompt the client user to input information for defining a type of message of which the client user wishes to be notified when the console client 14 receives the type of message.

First, each type of message of which the client user wishes to be notified is defined as a notification condition by inputting the following information items in the Notification Condition tab 41 of the Notification Setting dialog box 40, which includes input areas 42, 43, 44, 45, 46, and 47 for an event name, a system type, a system name, a job name 45, a message identifier, and a message text, respectively.

The event name is a name given by the client user to each type of information which is carried by messages and of which the client user wishes to be notified. In the M example of FIG. 3, the name "subsystem abnormality" is given.

The system type is a name of a type of operating system used in one of the servers 11*a*, 11*b*, 11*c*, . . . in the multiserver system 11 which outputs the message. In the example of FIG. 3, the input area 43 for the system type is realized by a pull-down menu which lists a plurality of names of a plurality of types of operating systems so that one of the plurality of names of the plurality of types of operating systems can be selected from the pull-down menu. In FIG. 3, the name of the operating system "XSP", which is used in the Global Servers manufactured by Fujitsu Limited, is indicated.

The system name is a name given to each of a plurality of servers which use an identical type of operating system for discriminating between the respective servers. In the example of FIG. 3, the input area 43 for the system type is realized by a pull-down menu which lists a plurality of system names of the plurality of servers which are predefined for each system type so that one of the plurality of system names can be selected from the pull-down menu when necessary.

The job name is a name of a job corresponding to a message output from the multiserver system 11, the message identifier is an identifier of each type of message, and the message text is text information carried by each message.

In addition, "*" stands for an arbitrary character string in the job name, the message identifier, and the message text.

Thus, a type of message of which the client user wishes to be notified is defined as a notification condition by inputting the above information items in the input areas 42 to 47 in the Notification Condition tab 41 of the Notification Setting dialog box 40.

(IV) Telephone Notification

Figure 4:
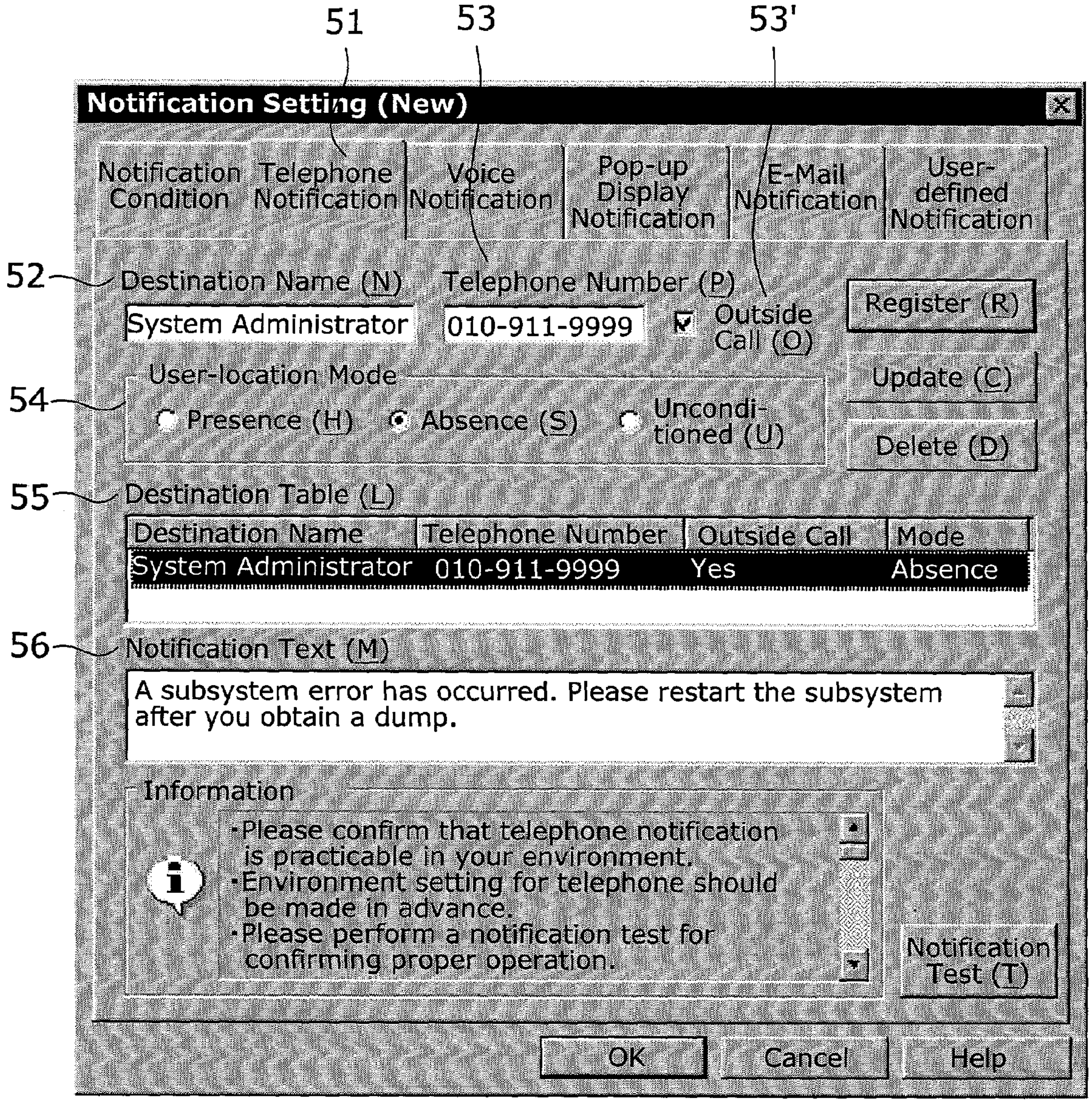
FIG. 4 is a diagram illustrating an example of a Telephone Notification tab of the Notification Setting dialog box.

When the client user wishes to be notified of reception of a message of the type defined in the Notification Condition tab 41 by telephone notification, the client user clicks the Telephone Notification tab 51 of the Notification Setting dialog box 40, so that the Telephone Notification tab 51 is displayed as illustrated in FIG. 4.

FIG. 4 is a diagram illustrating an example of the Telephone Notification tab 51 of the Notification Setting dialog box 40. The Telephone Notification tab 51 includes input areas 52, 53, 53', 54, and 56 for a destination name, a telephone number, an indication of an outside call, a user-location mode, and a notification text to be read out. In addition, the Telephone Notification tab 51 includes an indication area for a destination table 55.

The destination name is a name of the client user which is to be notified of reception of the message, and the telephone number is a telephone number of the client user. In addition, the input area 53' for the indication of the outside call is realized by a check box which is to be checked in the case of an outside call.

The input area 54 for the user-location mode is realized by a set of option buttons corresponding to three modes "Presence", "Absence", and "Unconditioned." The option button corresponding to the "Presence" mode is checked in the case where the client user wishes to be notified of reception of a message of the type defined in the Notification Condition tab 41 by telephone notification when the client user is present at the console client 14. The option button corresponding to the "Absence" mode is checked in the case where the client user wishes to be notified of reception of a message of the type defined in the Notification Condition tab 41 by telephone notification when the client user is not present at the console client 14. The option button corresponding to the "Unconditioned" mode is checked in the case where the client user wishes to be notified of reception of a message of the type defined in the Notification Condition tab 41 by telephone notification regardless of whether or not the client user is present at the console client 14.

The destination table 55 indicates the contents which are input in the input areas 52 to 54 in a tabular form.

The client user can input in the input area 56 a notification text with which the client user is to be notified of a message of the type defined in the Notification Condition tab 41 by telephone notification.

When the console client 14 receives a message of the type defined in the Notification Condition tab 41 illustrated in FIG. 3 in the situation in which the information is input in the input areas 52, 53, 54, and 56 as illustrated in FIG. 4, the console client 14 makes a call to the telephone number indicated in the input area 53, and reads out with synthesized voice the notification text indicated in the input area 56. Therefore, the telephone notification is effective, for example, when the system administrator or the operator is at a meeting, out for a business trip, or home. When the system administrator or the operator is in a room other than the room in which the console client 14 is placed, an extension number is input into the input area 53 for the telephone number, and the check box 53' for the outside call in the Telephone Notification tab 51 is unchecked.

Since the telephone notification can realize real-time notification, the telephone notification is suitable for events which require a quick reaction.

(V) Second Example of Definition of Notification Condition

Figure 5:
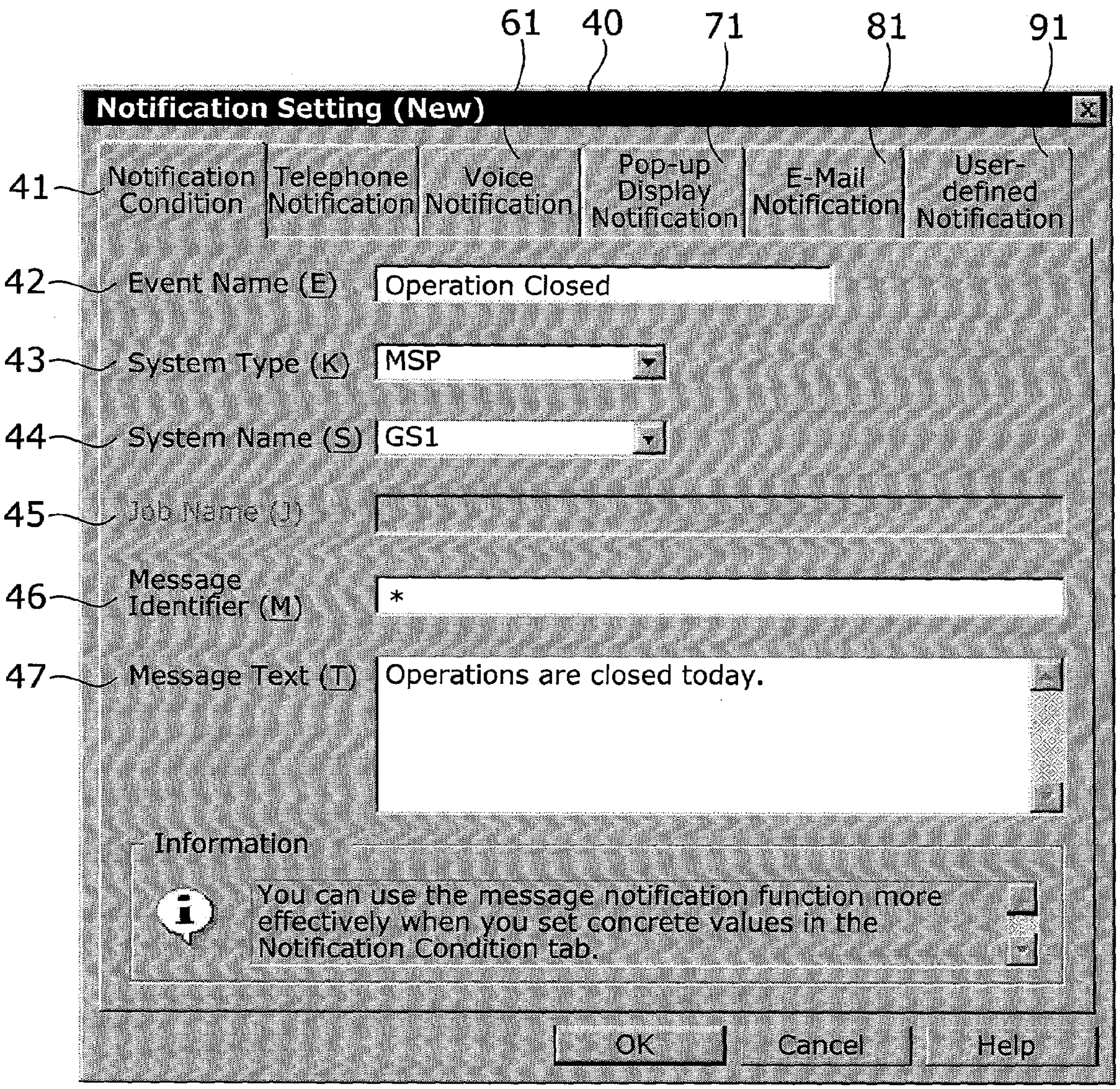
FIG. 5 is a diagram illustrating a second example of information which is input in the Notification Condition tab of the Notification Setting dialog box.

FIG. 5 is a diagram illustrating a second example of information which is input in the Notification Condition tab 41 of the Notification Setting dialog box 40. In the example of FIG. 5, a type of message which informs the client user of closing of operations of a server is defined.

Specifically, in the example of FIG. 5, an event name "Closing of Operations" is input in the input area 42 for the event name, a system type "MSP" is input in the input area 43, a system name "GS1" is input in the input area 44, "*" is input in the input area 46 for the message identifier, and a message text "*OPERATIONS ARE CLOSED TODAY*" is input in the input area 47.

Some system types limit information which can be input in the other input areas. In the example of FIG. 5, the system type "MSP" input in the input area 43 prohibits input of information in the input area 45.

(VI) Voice Notification

Figure 6:
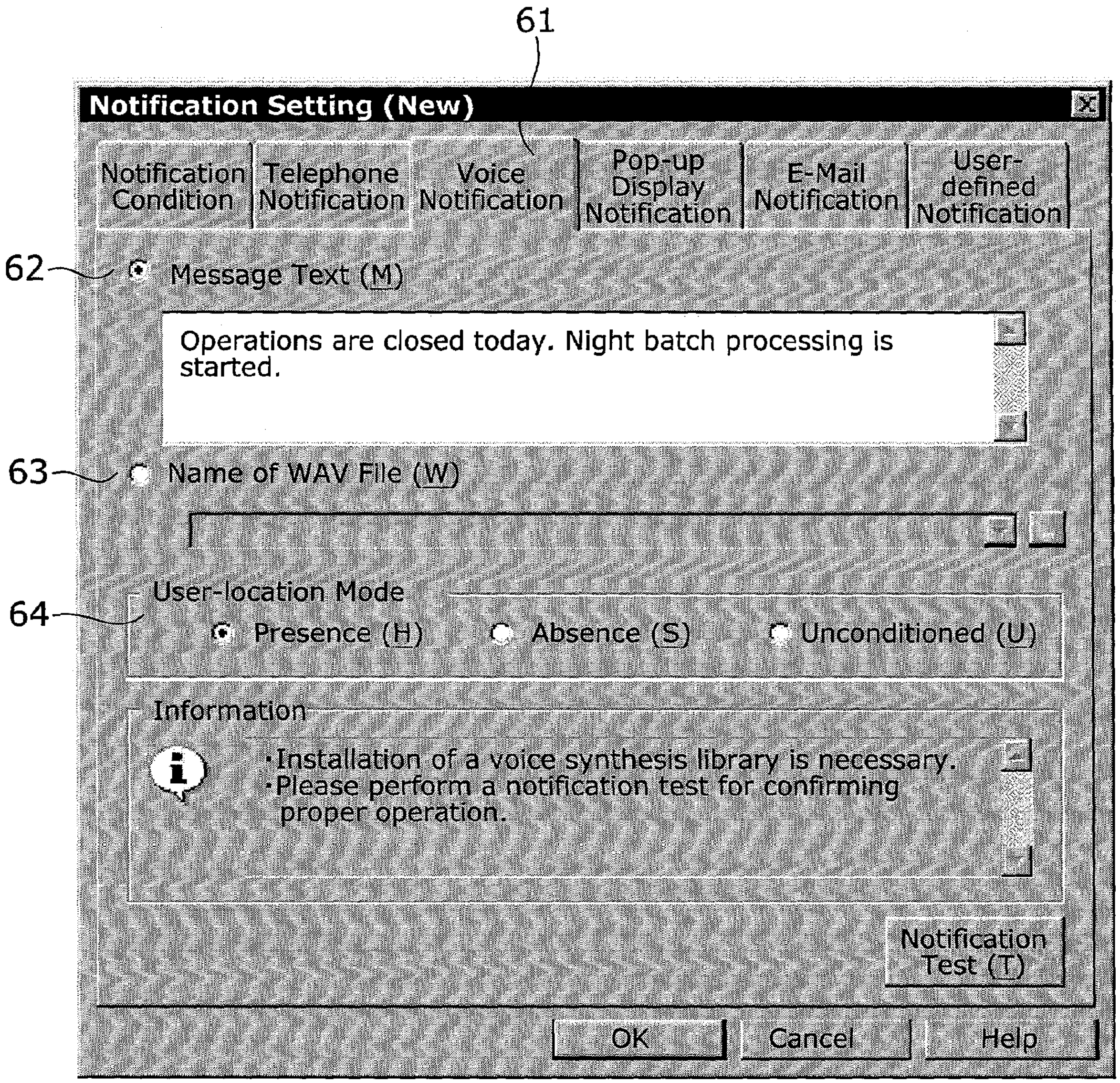
FIG. 6 is a diagram illustrating an example of a Voice Notification tab of the Notification Setting dialog box.

When the client user wishes to be notified of reception of a message of the type defined in the Notification Condition tab 41 by voice notification, the client user clicks the Voice Notification tab 61 of the Notification Setting dialog box 40, so that the Voice Notification tab 61 is displayed as illustrated in FIG. 6.

FIG. 6 is a diagram illustrating an example of the Voice Notification tab 61 of the Notification Setting dialog box 40. The Voice Notification tab 61 includes input areas 62, 63, and 64 for a notification text to be read out, a name of a WAV file, and a user-location mode, respectively.

In the case of voice notification, it is possible to choose whether to notify the client user of reception of a message of the type defined in the Notification Condition tab 41 with synthesized voice or voice regenerated from a WAV file. When the client user wishes to be notified of the reception with synthesized voice, the client user inputs in the input area 62 a notification text with which the client user wishes to be notified of reception of a message by synthesized voice. When the client user wishes to be notified of the reception with voice regenerated from a WAV file, the client user inputs in the input area 63 a name of the WAV file from which the voice is to be regenerated for notification of the reception of the message to the client user. In addition, the user-location mode is input in the input area 64 in a similar manner to the input in the input area 54 of the Telephone Notification tab 51.

When the console client 14 receives a message of the type defined in the Notification Condition tab 41 illustrated in FIG. 5 in the situation in which the information is input in the input areas 62 and 64 as illustrated in FIG. 6, the console client 14 reads out the notification text indicated in the input area 62 by using the synthesized-voice generation unit 27 and the speaker 33. When the console client 14 receives a message of the type defined in the Notification Condition tab 41 illustrated in FIG. 5 in the situation in which the information is input in the input areas 63 and 64 in FIG. 6, the console client 14 regenerates a voice message from the WAV file indicated in the input area 63 by using the WAV-file regeneration unit 26, and reads out the voice message by using the speaker 33.

The voice notification is effective, for example, when the system administrator or the operator is monitoring the multiserver system 11 on the console client 14, or doing another job in the background of the monitoring job on the console client 14, or doing another job in the vicinity of the console client 14.

(VII) Pop-up Display Notification

Figure 7:
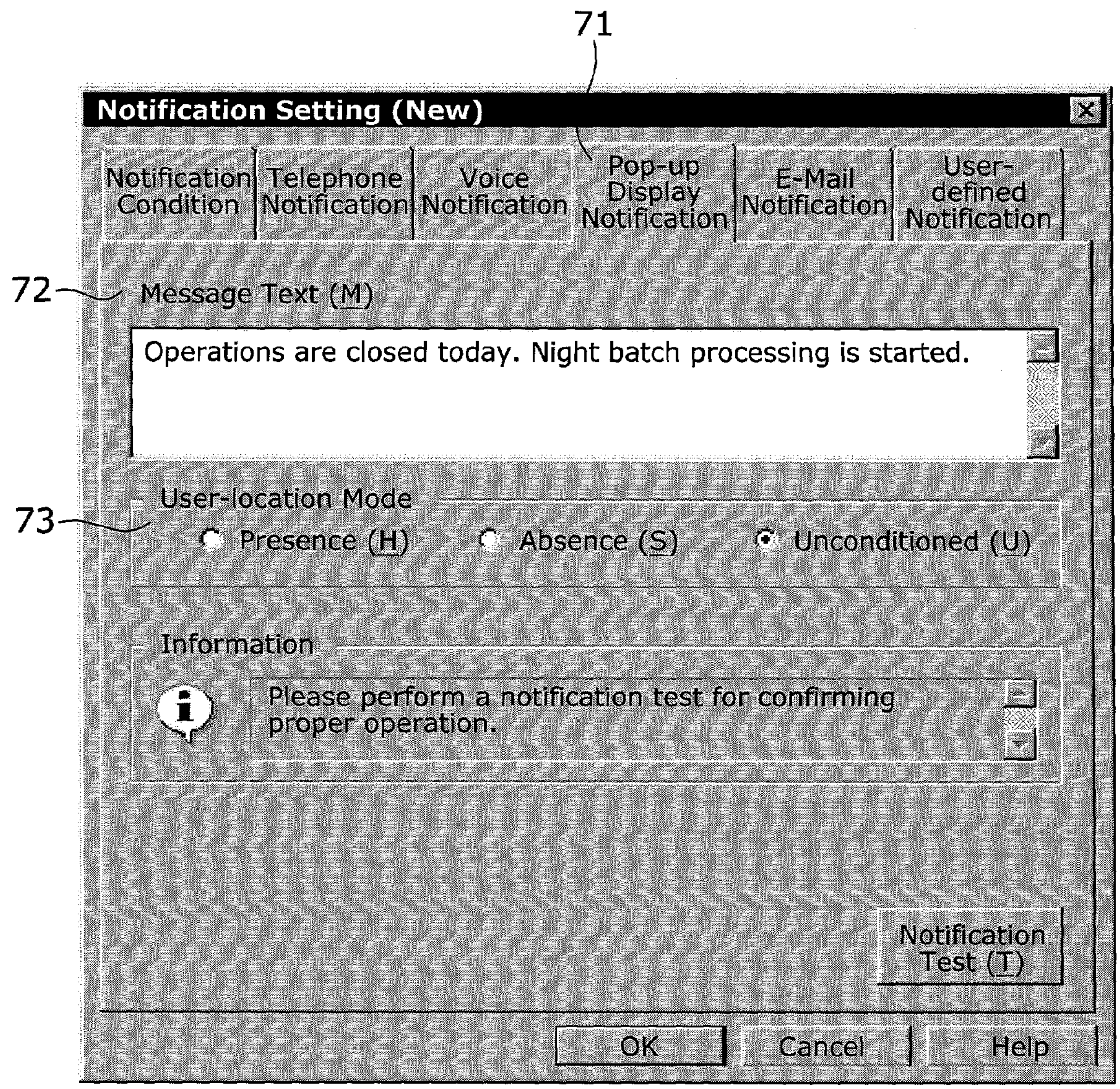
FIG. 7 is a diagram illustrating an example of a Pop-up Display Notification tab of the Notification Setting dialog box.

When the client user wishes to be notified of reception of a message of the type defined in the Notification Condition tab 41 by pop-up display notification, the client user clicks the Pop-up Display Notification tab 71 of the Notification Setting dialog box 40, so that the Pop-up Display Notification tab 71 is displayed as illustrated in FIG. 7.

FIG. 7 is a diagram illustrating an example of the Pop-up Display Notification tab 71 of the Notification Setting dialog box 40. The Pop-up Display Notification tab 71 includes an input area 72 for a character string (as a notification text) to be indicated in the pop-up display and another input area 73 for the user-location mode.

When the console client 14 receives a message of the type defined in the Notification Condition tab 41 illustrated in FIG. 5 in the situation in which the information is input in the input areas 72 and 73 as illustrated in FIG. 7, the console client 14 displays a pop-up notification window indicating the notification text input in the input area 72, by using the pop-up-display control unit 25 and the monitor 32.

The pop-up display notification is effective, for example, when the system administrator or the operator is monitoring the multiserver system 11 on the console client 14, or doing another job in the background of the monitoring job on the console client 14, or doing another job in the vicinity of the console client 14.

Figure 8:
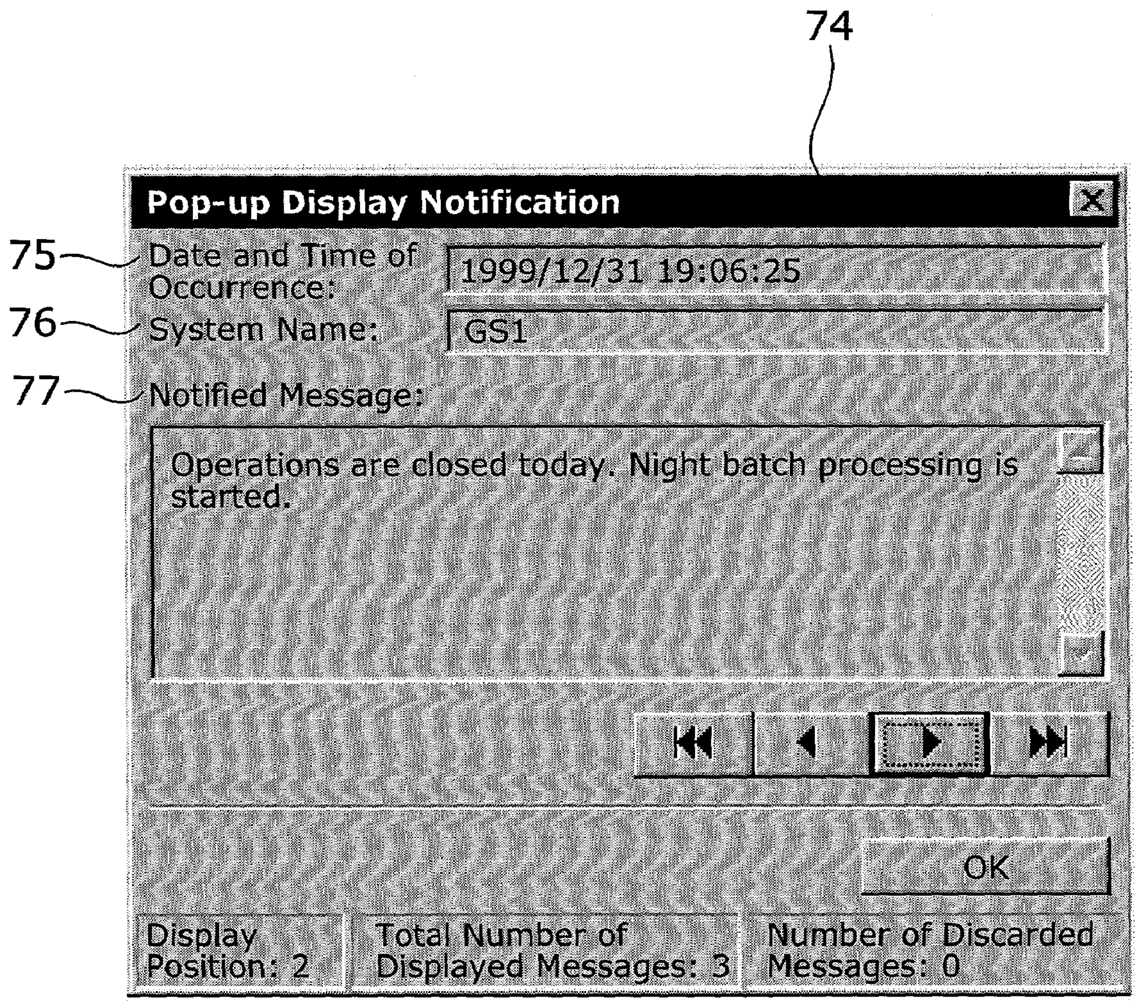
FIG. 8 is a diagram illustrating an example of a pop-up notification window.

FIG. 8 is a diagram illustrating an example of the pop-up notification window. The pop-up notification window 74 of FIG. 8 has a form of a dialog box including no tab, and three indication areas 75, 76, and 77 for date and time of occurrence, a system name, and a notified message (notification text).

In the indication area 77, the notification text in the input area 72 of the Pop-up Display Notification tab 71 is indicated.

When the console client 14 receives a new message of which the client user is to be notified by pop-up display notification in a situation in which a pop-up notification window notifying the client user of reception of a formerly received message is already displayed by the monitor 32, another notification text input in the input area 72 corresponding to the new message is appended to the indication area 77. The maximum number of texts which can be appended to the indication area 77 in the pop-up notification window 74 can be set in the console client 14. For example, the maximum number of texts may be 99. When the console client 14 receives a further message of which the client user is to be notified by pop-up display notification, after the number of received messages of which the client user is to be notified by pop-up display notification reaches the maximum number set in the console client 14, the excessive message is discarded.

In the indication area 77, indication can be moved from a notification text to another notification text by clicking the single- and double-arrow buttons.

(VIII) E-mail Display Notification

Figure 9:
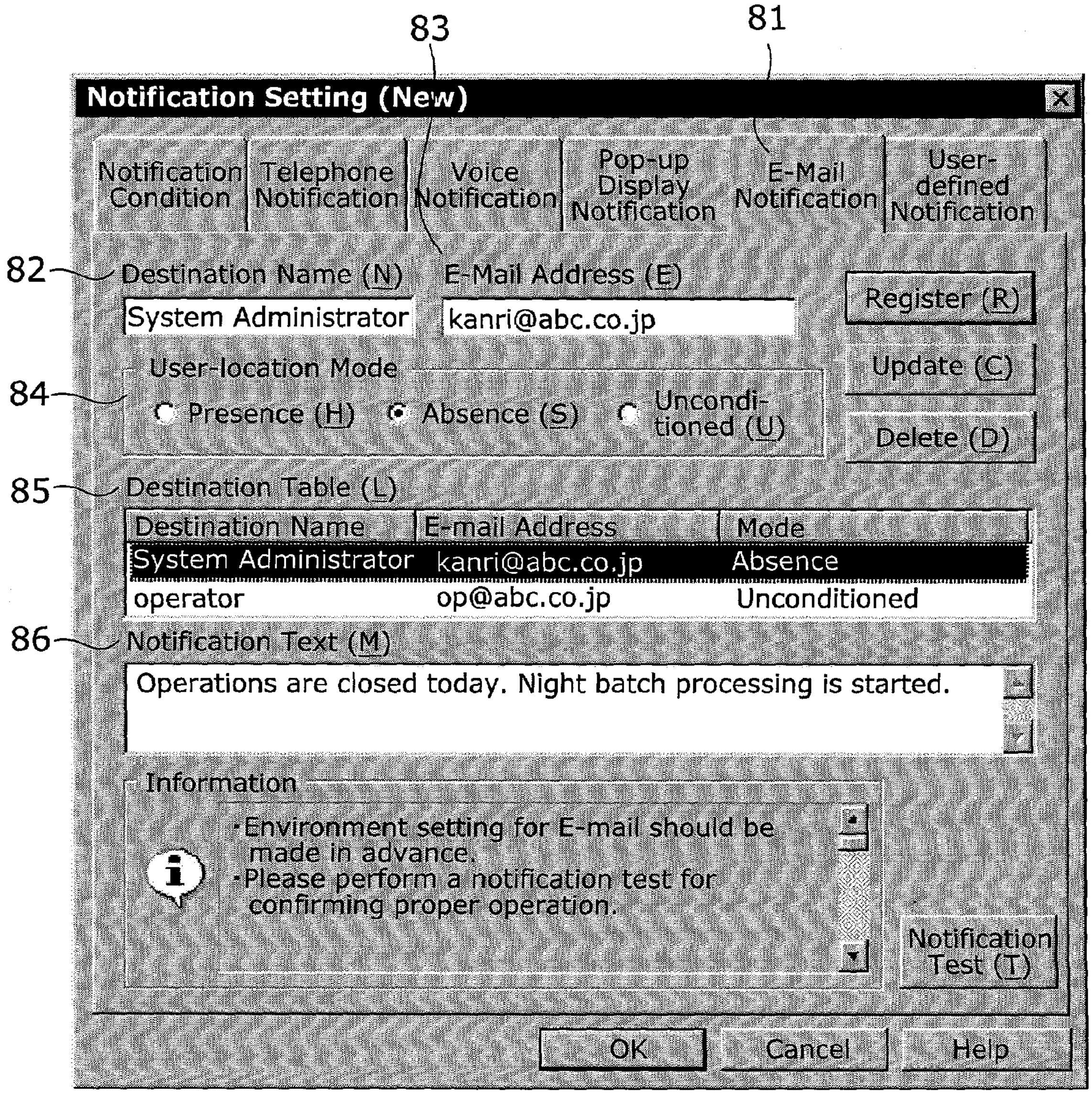
FIG. 9 is a diagram illustrating an example of an E-mail Notification tab of the Notification Setting dialog box.

When the client user wishes to be notified of reception of a message of the type defined in the Notification Condition tab 41 by e-mail notification, the client user clicks the E-mail Notification tab 81 of the Notification Setting dialog box 40, so that the E-mail Notification tab 81 is displayed as illustrated in FIG. 9.

FIG. 9 is a diagram illustrating an example of the E-mail Notification tab 81 of the Notification Setting dialog box 40. The E-mail Notification tab 81 includes input areas 82, 83, 84, and 86 for a destination name, an e-mail address, a user-location mode, and a notification text to be included in an e-mail, respectively. In addition, the E-mail Notification tab 81 includes an indication area for a destination table 85.

The destination name is a name of the client user which is to be notified of reception of the message, and the e-mail address is an e-mail address of the client user.

The user-location mode is input in the input area 84 in the E-mail Notification tab 81 in a similar manner to the input in the input area 54 of the Telephone Notification tab 51.

The destination table 85 indicates the contents which are input in the input areas 82 to 84 in a tabular form.

The client user can input in the input area 86 a notification text with which the client user is to be notified of reception of a message by e-mail notification when the console client 14 receives a message of the type defined in the Notification Condition tab 41 illustrated in FIG. 5.

When the console client 14 receives a message of the type defined in the Notification Condition tab 41 illustrated in FIG. 5 in the situation in which the information is input in the input areas 82, 83, 84, and 86 as illustrated in FIG. 9, the console client 14 sends an e-mail including the notification text indicated in the input area 86 to the e-mail address indicated in the input area 83.

Therefore, the e-mail notification is effective, for example, when the system administrator or the operator is at a meeting, out for a business trip, or home. The client user can use a personal computer, a mobile information terminal, a mobile telephone having a function of receiving an e-mail, and the like as a terminal for receiving the e-mail.

However, since the e-mail notification cannot guarantee real-time notification, the e-mail notification is not suitable for events which require a quick reaction.

(IX) User-defined Notification

Figure 10:
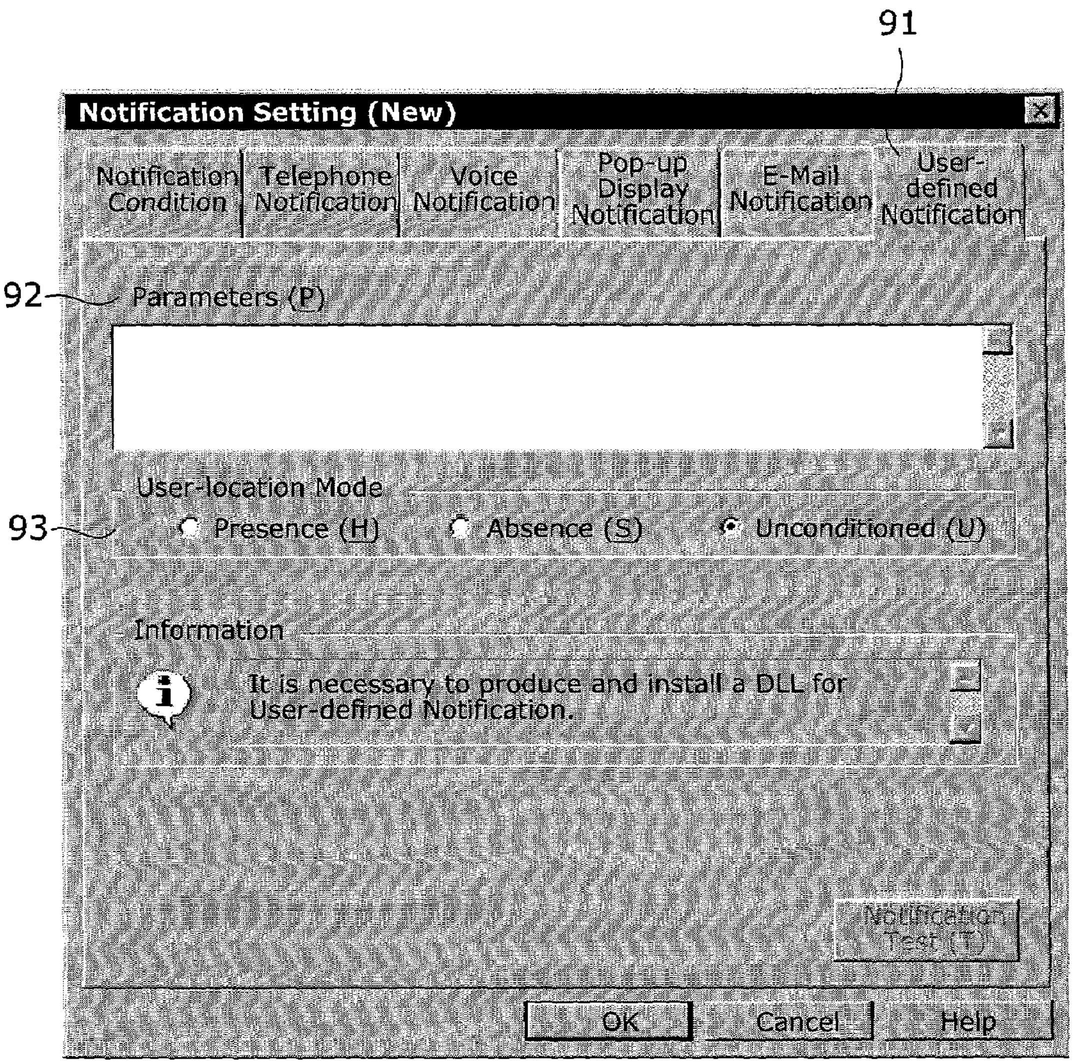
FIG. 10 is a diagram illustrating an example of a User-defined Notification tab of the Notification Setting dialog box.

When the client user wishes to be notified of reception of a message of the type defined in the Notification Condition tab 41 by user-defined notification (i.e., in a manner which is originally defined by the client user), the client user clicks the User-defined Notification tab 91 of the Notification Setting dialog box 40, so that the User-defined Notification tab 91 is displayed as illustrated in FIG. 10.

The user-defined notification is, for example, sound notification using a siren, paging notification using a pager terminal, or the like. Although not shown in FIG. 2, it is necessary that the console client 14 further comprises a notification means and an application program which are produced by the client user for realizing the user-defined notification.

FIG. 10 is a diagram illustrating an example of the User-defined Notification tab 91 of the Notification Setting dialog box 40. The User-defined Notification tab 91 includes input areas 92 and 93 for (user-defined) parameters and a user-location mode, respectively.

The user-location mode is input in the input area 93 in the User-defined Notification tab 91 in a similar manner to the input in the input area 54 of the Telephone Notification tab 51.

The parameters are input in the input area 92 by the client user so that the user-defined notification is realized by the notification means and the application program based on the parameters.

When the console client 14 receives a message of the type defined in the Notification Condition tab 41 illustrated in FIG. 5 in the situation in which the information is input in the input areas 92 and 93 as illustrated in FIG. 10, the console client 14 supplies the parameters indicated in the input area 92 to the application program, so that the user-defined notification is realized by using the application program and the notification means.

(X) Definition Table

Figure 11:
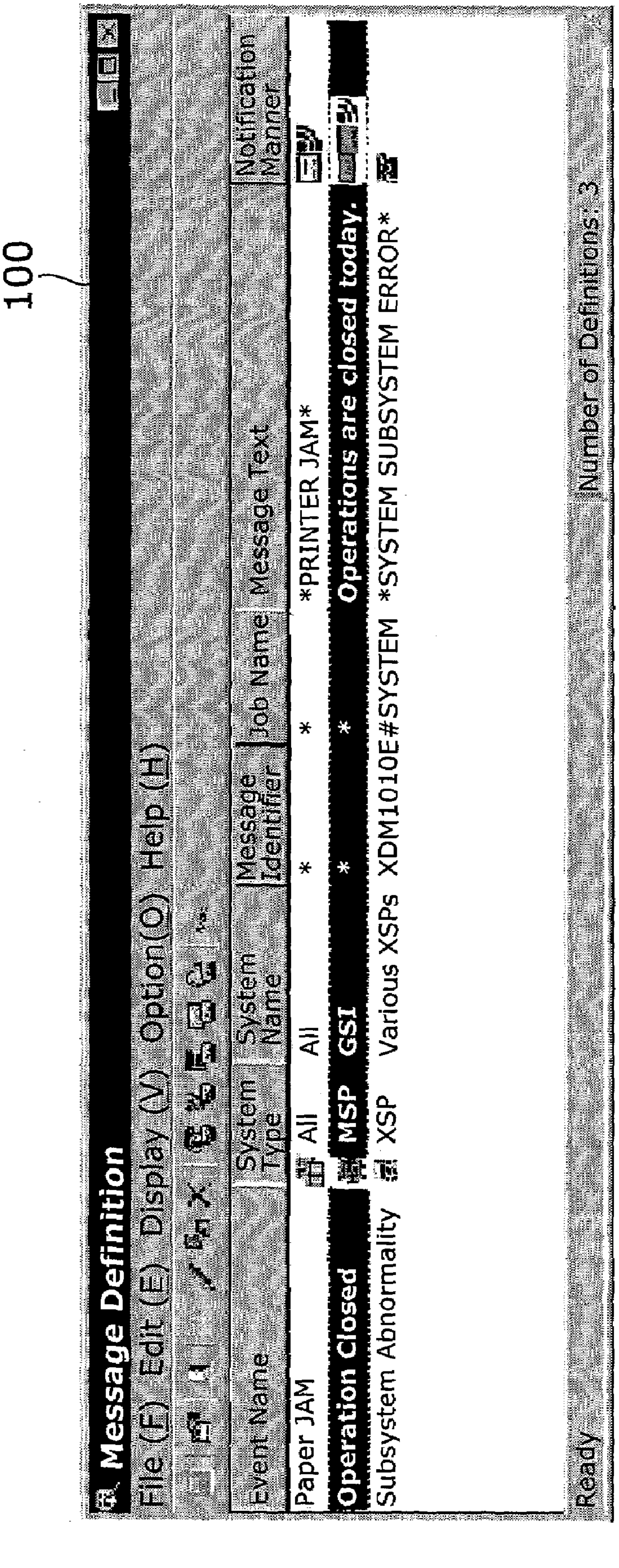
FIG. 11 is a diagram illustrating an example of a message definition window which is produced by the definition processing unit.

The types of messages defined in the Notification Condition tab 41 of the Notification Setting dialog box 40 and the notification manners defined in the other tabs of the Notification Setting dialog box 40 can be displayed in a message definition window as illustrated in FIG. 11.

FIG. 11 is a diagram illustrating an example of the message definition window which is produced by the definition processing unit 21. The message definition window 100 indicates for each type of message the information items defined in the tabs of the Notification Setting dialog box 40, where the information items include the event name, the system type, the system name, the message identifier, the job name, the message text, and the notification manner.

Thus, when the message definition window 100 is referred to, it is possible to recognize at a glance the defined types of messages and at least one notification manner defined corresponding to each type of message.

(XI) Message Definition File

FIG. 12 is a diagram illustrating examples of the contents of the message definition file 22 in FIG. 2. The contents 110 of the message definition file 22 illustrated in FIG. 12 include an index section 111 and a data section 112. The index section 111 stores a notification condition (i.e., information on at least one type of message of which the client user is to be notified), and the data section 112 stores information on the notification manners.

The index section 111 begins with the description "[Index Section Start]" and ends with the description "[Index Section End]."

The notification condition includes the system type, the system name, the message identifier, the job name, and the message text for each type of message of which the client user is to be notified. The respective information items constituting the notification condition are marked off with horizontal tab codes "¥t", and the information items for different types of messages are separated from each other with a line feed.

When "all" is indicated for the system name, "*" is recorded for the system name in the message definition file. In addition, some specific system types do not allow designation of the message identifier and the job name. In this case, "*" is recorded for the message identifier and the job name in the message definition file.

In the data section 112, information on at least one notification manner for each type of message is stored. The data section 112 begins with the description "[Data Section Start]" and ends with the description "[Data Section End]."

The event name is written in the first line following the description "[Data Section Start]."

The information on each notification manner begins with a character string indicating the notification manner, and information item defining the notification manner, which are marked off with horizontal tab codes "¥t", follow the character string. The information items for different notification manners are separated from each other with a line feed.

For example, the information on telephone notification begins with the character string "TEL", and the information items of the destination name, the telephone number, the indication of the outside call, the notification text to be read out, and the user-location mode, which are marked off with horizontal tab codes "¥t", follow the character string "TEL." The indication of the outside call is "0" when an outside call is to be made, and "1" when an outside call is not to be made. The information item of the user-location mode is "0" when the "Presence" is chosen in the input area 54 in the Telephone Notification tab 51, "1" when the "Absence" is chosen, and "2" when the "Unconditioned" is chosen.

The information on voice notification begins with the character string "VOICE", and the information items of the choice between the synthesized voice and the voice regenerated from a WAV file, the notification text to be read out or a name of the WAV file, and the user-location mode, which are marked off with horizontal tab codes "¥t", follow the character string "VOICE." The information item of the choice between the synthesized voice and the voice regenerated from a WAV file is "0" in the case of the synthesized voice and "1" in the case of the voice regenerated from a WAV file. The information item of the user-location mode is determined in the same manner as that in the case of the telephone notification.

The information on pop-up display notification begins with the character string "POPUP", and the information items of the message text and the user-location mode, which are marked off with horizontal tab codes "¥t", follow the character string "POPUP." The information item of the user-location mode is determined in the same manner as that in the case of the telephone notification.

The information on e-mail notification begins with the character string "EMAIL", and the information items of the destination name, the e-mail address, and the notification text to be included in an e-mail, and the user-location mode, which are marked off with horizontal tab codes "¥t", follow the character string "EMAIL." The information item of the user-location mode is determined in the same manner as that in the case of the telephone notification.

The information on user-defined notification begins with the character string "USER", and the information items of the user-defined parameters and the user-location mode, which are marked off with horizontal tab codes "¥t", follow the character string "USER."

(XII) Message Notification Record

Figure 13:
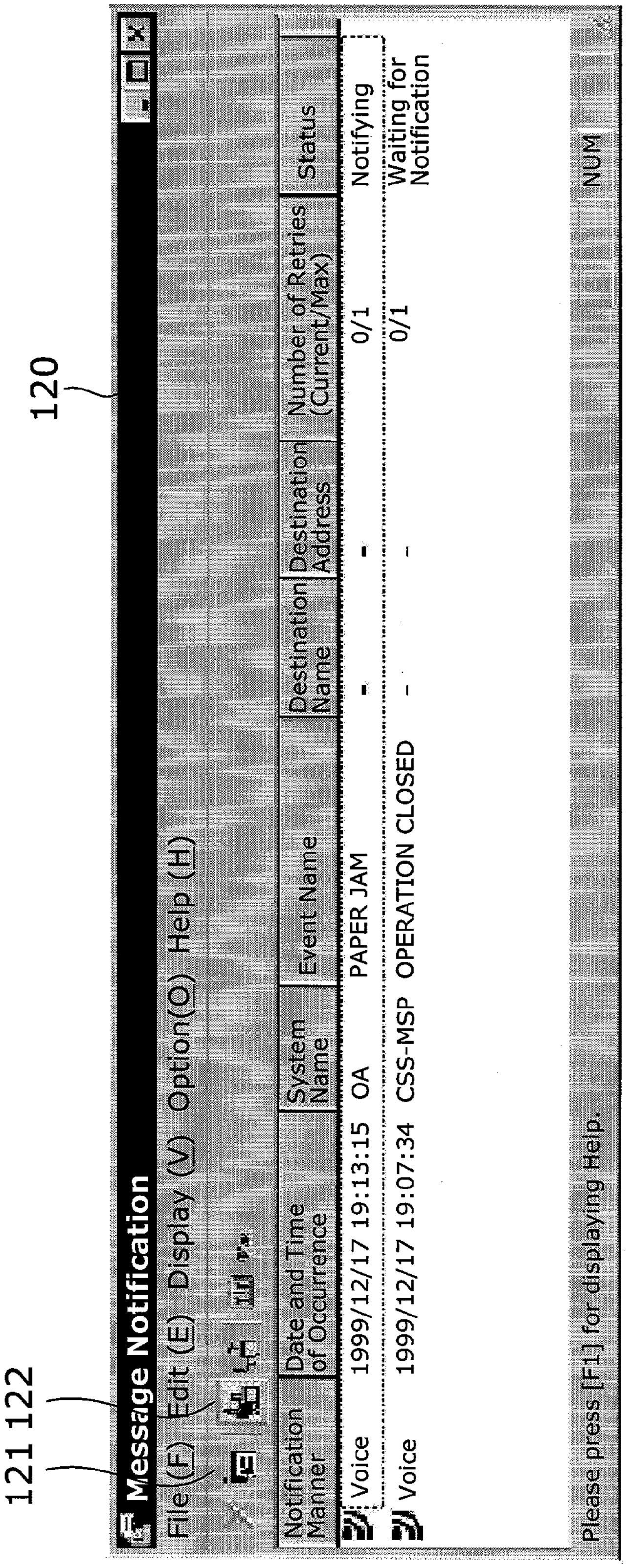
FIG. 13 is a diagram illustrating an example of a window indicating a notification request table.

FIG. 13 is a diagram illustrating an example of a window indicating a notification request table. The notification request table indicated in the window 120 of FIG. 13 includes information items of the notification manner, the date and time of occurrence, the system name, the event name, the destination name, the destination address, the number of retries, and the status of notification for each message which is received by the console client 14 and of which the client user is to be notified.

In addition, the window 120 includes a Presence button 121 and an Absence button 122 so that the client user can indicate whether the client user wishes notification in the Presence mode or the Absence mode. That is, when the client user clicks the Presence button 121, only at least one of the notification manners which is defined based on selection of the Presence mode (i.e., selection of the option button corresponding to the Presence mode in the Telephone Notification tab 51, the Voice Notification tab 61, the E-mail Notification tab 81, and the User-defined Notification tab 91) is used. On the other hand, when the client user clicks the Absence button 122, only at least one of the notification manners which is defined based on selection of the Absence mode (i.e., selection of the option button corresponding to the Absence mode in the Telephone Notification tab 51, the Voice Notification tab 61, the E-mail Notification tab 81, and the User-defined Notification tab 91) is used.

When the status indication for a message which is indicated in the notification request table in the window 120 is "WAITING", the notification of the message is not yet made. In this case, the message can be deleted from the notification request table. For example, when a plurality of notification manners are defined for a message indicated in the notification request table, and the client user has already been notified of the message by one of the plurality of notification manners, or when the client user who has been absent comes back to the console client 14, and finds in the notification request table in the window 60 a message of which notification in the Absent mode is to be made, the indication of the message can be deleted from the notification request table.

(XIII) Hardware Construction

Figure 14:
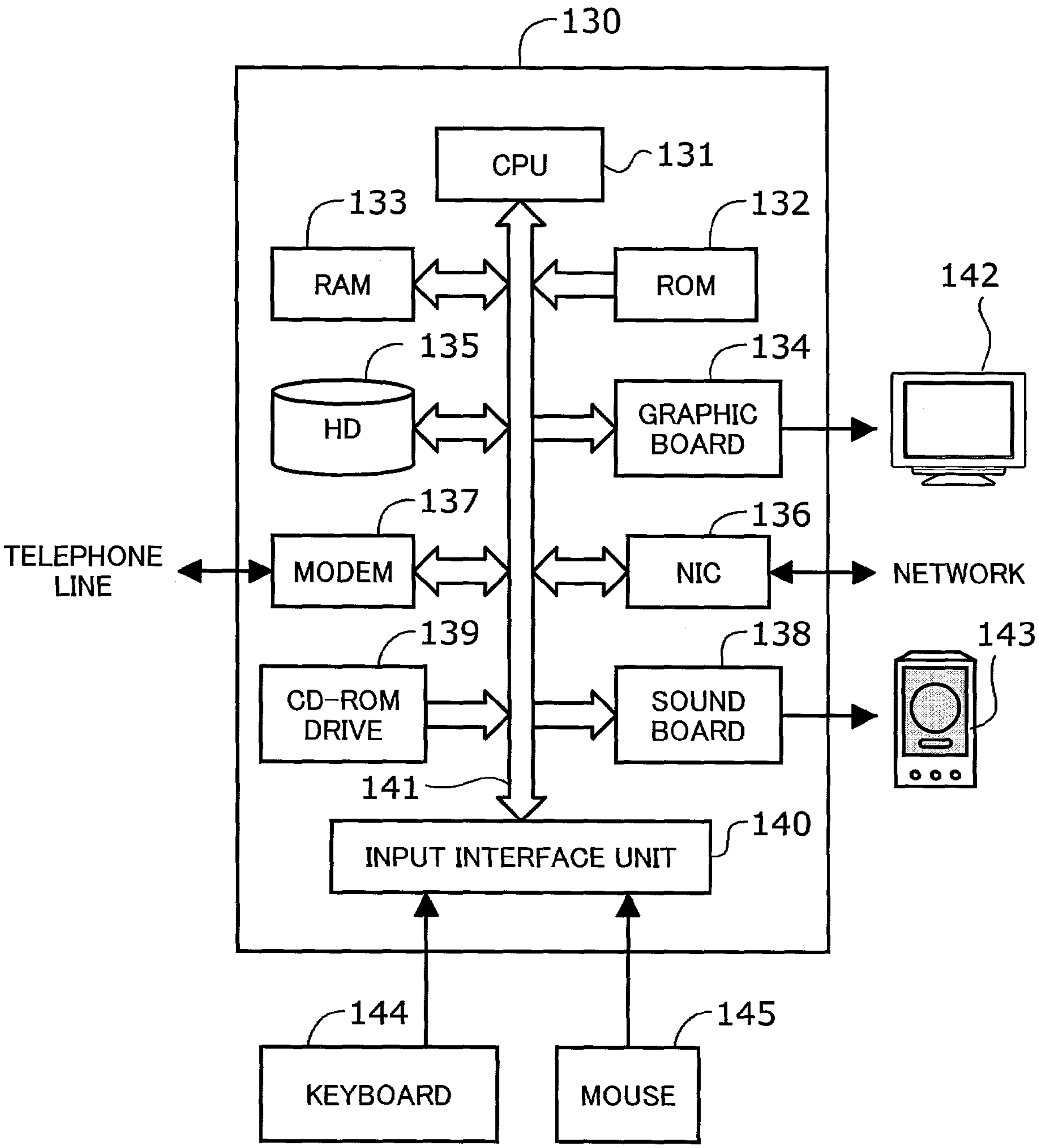
FIG. 14 is a diagram illustrating an example of a hardware construction of a computer realizing a console client which includes the message notification apparatus.

The console client 14 including the message notification apparatus according to the present invention can be realized by a computer which has the following hardware construction. FIG. 14 is a diagram illustrating an example of a hardware construction of the computer realizing the console client 14 which includes the message notification apparatus.

As illustrated in FIG. 14, the computer 130 comprises a CPU (central processing unit) 131, a ROM (read-only memory) 132, a RAM (main memory) 133, a graphic board 134, an HDD (hard disk drive) 135, an NIC (network interface card) 136, a modem 137, a sound board 138, and a CD-ROM (Compact Disk Read Only Memory) drive 139, and an input interface unit 140, which are interconnected through a bus 141. The graphic board 134 is connected to a display device 142, the sound board 138 is connected to a speaker 143, and the input interface unit 140 is connected to a keyboard 144 and a mouse 145. The display device 142 and the speaker 143 in FIG. 14 correspond to the monitor 32 and the speaker 33 in FIG. 2, respectively.

The CPU 131 executes a message notification program which realizes the functions of the message notification apparatus. The ROM 132 stores a basic input/output system which is arranged between the hardware and an operating system, and controls data exchange. The message notification program and other data are loaded in the main memory 133, and supplied from the main memory 133 to the CPU 131. The graphic board 134 generates data for image display, and supplies the data to the display device 142. The HDD 135 stores the operating system, the message notification program, and the message definition file 22. The NIC 136 is connected to a network to which, for example, a mail server is connected. The modem 137 is connected to a telephone line for telephone notification. The sound board 138 converts a notification text into a synthesized voice signal or regenerates a voice signal from a WAV file for reading out the notification text, and supplies the synthesized or regenerated voice signal to the speaker 143. The message notification program is recorded in the CD-ROM drive 139, which is used for installing the message notification program in the HDD 135.

(XIV) Second Embodiment

The second embodiment of the present invention is explained below. In the second embodiment, the message notification apparatus automatically determines the user-location mode (i.e., determines whether or not the client user is present at the console client 14), and then determines at least one notification manner based on the user-location mode. The message notification apparatus as the second embodiment of the present invention comprises a construction for determining whether or not the client user is present at the console client 14, in addition to the construction of the first embodiment of the present invention as illustrated in FIG. 2.

Figure 15:
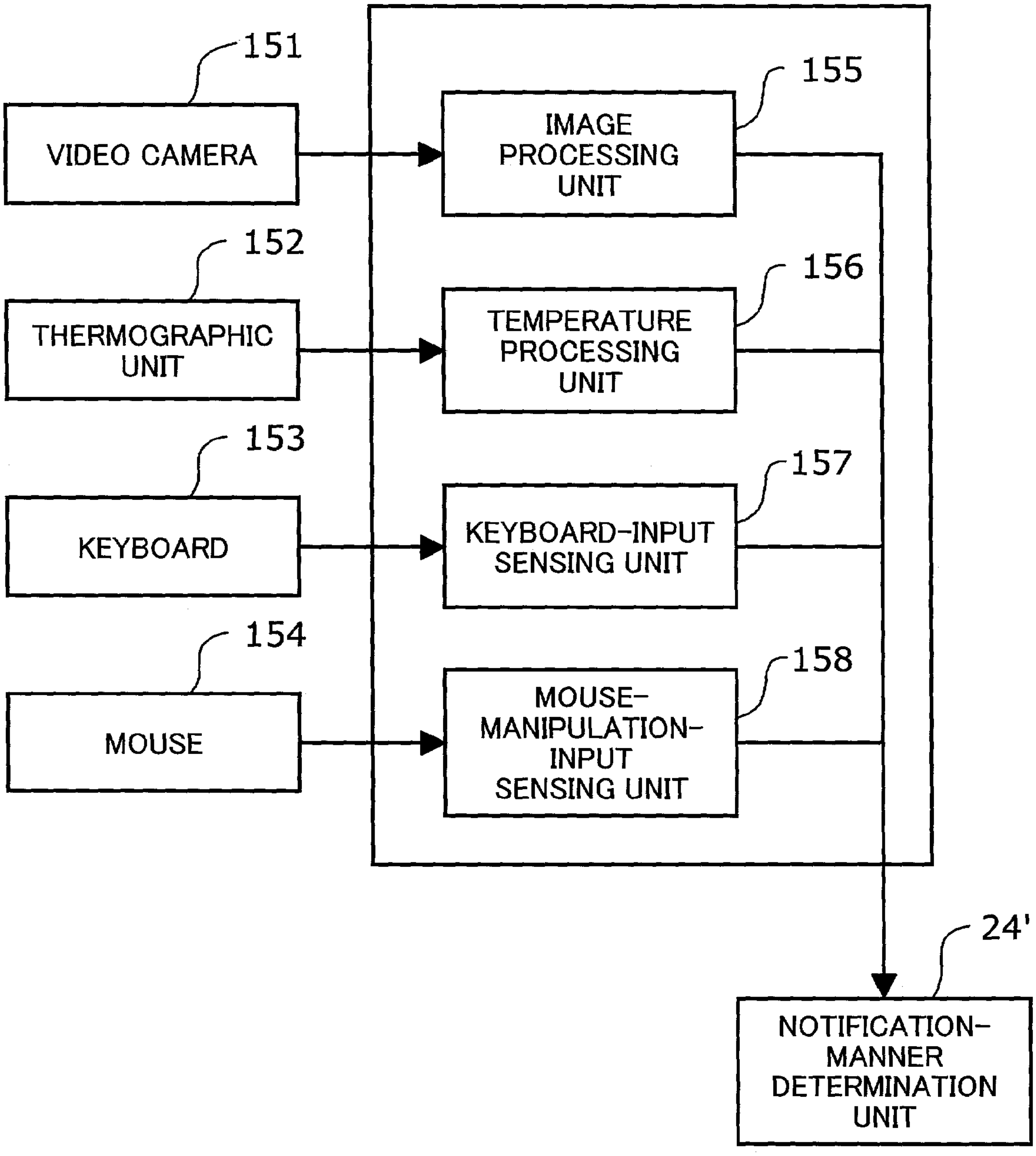
FIG. 15 is a diagram illustrating an example of an additional construction for determining whether or not the client user is present at the console client, which is provided in the message notification apparatus as the second embodiment of the present invention.

FIG. 15 is a diagram illustrating an example of the additional construction for determining whether or not the client user is present at the console client 14, which is provided in the message notification apparatus as the second embodiment of the present invention. The construction for determining whether or not the client user is present at the console client 14 comprises a video camera 151, a thermographic unit 152, a keyboard 153, a mouse 154, an image processing unit 155, a temperature processing unit 156, a keyboard-input sensing unit 157, and a mouse-manipulation-input sensing unit 158. The keyboard 144 and the mouse 145 in the construction of FIG. 14 can serve as the keyboard 153 and the mouse 154.

The video camera 151 is provided for obtaining an image of a scene in front of the console client 14, and the thermographic unit 152 is provided for remotely obtaining a temperature distribution in a space in front of the console client 14.

The video camera 151 generates image data representing the image of the scene in front of the console client 14, and supplies the image data to the image processing unit 155. The thermographic unit 152 generates temperature distribution data representing the temperature distribution in the space in front of the console client 14, and supplies the temperature distribution data to the temperature processing unit 156. In addition, the outputs of the keyboard 153 and the mouse 154 are supplied to the keyboard-input sensing unit 157 and the mouse-manipulation-input sensing unit 158, respectively.

The image processing unit 155 receives the image data from the video camera 151, and processes the image data in order to determine whether or not the client user is present at the console client 14. The temperature processing unit 156 receives the temperature distribution data from the thermographic unit 152, and processes the temperature distribution data in order to determine whether or not the client user is present at the console client 14.

The keyboard-input sensing unit 157 monitors manipulation input through the keyboard 153, and the mouse-manipulation-input sensing unit 158 monitors manipulation input through the mouse 154, in order to determine whether or not the client user is present at the console client 14.

Thus, information indicating whether or not the client user is present at the console client 14 is output from each of the image processing unit 155, the temperature processing unit 156, the keyboard-input sensing unit 157, and mouse-manipulation-input sensing unit 158, and is supplied to the notification-manner determination unit 24'. The notification-manner determination unit 24' in the message notification apparatus as the second embodiment of the present invention is provided instead of the notification-manner determination unit 24 in the first embodiment, and determines at least one manner in which the client user is to be notified of the reception of the message based on the type of the received message and the outputs from the image processing unit 155, the temperature processing unit 156, the keyboard-input sensing unit 157, and mouse-manipulation-input sensing unit 158.

The image processing unit 155, the temperature processing unit 156, the keyboard-input sensing unit 157, and mouse-manipulation-input sensing unit 158 are respectively realized by programs executed by the computer.

According to the second embodiment of the present invention, the message notification apparatus automatically determines whether or not the client user is present at the console client 14. Therefore, the client user is not required to input the information on whether or not the client user is present at the console client 14.

(XV) Storage Medium

The functions described above are realized by execution of programs by the aforementioned computer, and the programs can be stored in a computer-readable storage medium. The computer-readable storage medium may be a magnetic storage device, a semiconductor memory, or the like.

In order to put the program into the market, the programs may be stored in a portable storage medium such as a CD-ROM or a floppy disk (FD). Alternatively, the programs can be stored in a storage device belonging to a server computer, and transferred to another computer through a network.

In order to execute the programs by a computer, the programs, which are recorded in a portable storage medium or transferred from a server computer, are installed in a storage belonging to the computer. Then, the programs installed in the storage are loaded in a main memory for execution.

(XVI) Variations and Other Matters (i) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A message notification apparatus comprising:

a condition setting unit which receives message-type information defining at least two types of messages of which an operator is to be notified of reception, and notification-manner information defining two or more manners in which said operator is to be notified of reception of each of the types of messages, each of said manners having operator location information that includes a condition related to possible locations of said operator;

a condition storing unit which stores said message-type information and said notification-manner information;

a message comparing unit which receives a message output from a monitored system, and compares the received message with said one or more types of messages based on said message-type information;

a notification-manner determining unit which determines at least one manner in which said operator is to be notified of the reception of the message, based on said notification-manner information, as well as on the condition indicated in said operator location information indicating where said operator is currently visiting, when said message is identified as one of said types of messages; and a notification unit which notifies said operator of reception of said message in the at least one manner determined by said notification-manner determining unit, wherein said operator location information indicates whether or not said operator is present at said message notification apparatus, and further wherein when said operator location information indicates that said operator is present at said message notification apparatus, said operator is notified of reception of said message in each of said manners in which a present mode has been pre-selected, and when said operator location information indicates that said operator is not present at said message notification apparatus, said operator is notified of reception of said message in each of said manners in which an absent mode has been pre-selected, wherein said manners having said present mode pre-selected are all different from said manners having said absent mode pre-selected.

2. A message notification apparatus according to claim 1, wherein said operator location information is input into said message notification apparatus by said operator.

3. A message notification apparatus according to claim 1, further comprising a user-location detection unit which detects whether or not the operator is present at said message notification apparatus, and generates said operator location information therefrom.

4. A message notification apparatus according to claim 1, wherein said message-type information indicates at least one of a system type, a system name, a message identifier, a job name, and a message text.

5. A message notification apparatus according to claim 1, wherein said manners defined by said notification-manner information includes at least one of telephone notification, voice notification, pop-up display notification, e-mail notification, and user-defined notification.

6. A message notification method comprising the steps of:

(a) receiving operator location information indicating a current location of an operator, wherein said operator location information indicates whether or not said operator is present at a message notification apparatus;

(b) receiving a message from a monitored system;

(c) acquiring message-type information and notification-manner information from a storage unit, where said message-type information defines at least two types of messages of which said operator is to be notified of reception, and said notification-manner information defines two or more manners in which said operator is to be notified of reception of each of the types of messages, and each of said manners has operator location information that includes a condition related to possible locations of said operator;

(d) comparing said message received in step (b) with said types of messages defined by said message-type information;

(e) determining at least one manner in which said operator is to be notified of the reception of the message, based on said notification-manner information as well as on the condition indicated in said operator location information indicating where said operator is currently visiting, when said message is identified as one of said types of messages;

(f) notifying said operator of reception of said message in the at least one manner determined in step (e), such that when said operator location information indicates that said operator is present at said message notification apparatus, said operator is notified of reception of said message in each of said manners in which a present mode has been pre-selected, and when said operator location information indicates that said operator is not present at said message notification apparatus, said operator is notified of reception of said message in each of said manners in which an absent mode has been pre-selected, wherein said manners having said present mode pre-selected are all different from said manners having said absent mode pre-selected.

7. A computer-readable storage medium storing a program which makes a computer behave as a message notification apparatus comprising:

a condition setting unit which receives message-type information defining at least two types of messages of which an operator is to be notified of reception, and notification-manner information defining two or more manners in which said operator is to be notified of reception of each of the types of messages, each of said manners having operator location information that includes a condition related to possible locations of said operator, and wherein said operator location information indicates whether or not said operator is present at said message notification apparatus;

a condition storing unit which stores said message-type information and said notification-manner information;

a message comparing unit which receives a message output from a monitored system, and compares the received message with said types of messages based on said message-type information;

a notification-manner determining unit which determines at least one manner in which said operator is to be notified of reception of the message, based on said notification-manner information, as well as on the condition indicated in said operator location information indicating where said operator is currently visiting, when said message is identified as one of said types of messages; and a notification unit which notifies said operator of reception of said message in the at least one manner determined by said notification-manner determining unit, wherein when said operator location information indicates that said operator is present at said message notification apparatus, said operator is notified of reception of said message in each of said manners in which a present mode has been pre-selected, and when said operator location information indicates that said operator is not present at said message notification apparatus, said operator is notified of reception of said message in each of said manners in which an absent mode has been pre-selected, wherein said manners having said present mode pre-selected are all different from said manners having said absent mode pre-selected.

* * * * *